US012597352B2

(12) United States Patent
Sommer et al.

(10) Patent No.: US 12,597,352 B2
(45) Date of Patent: Apr. 7, 2026

(54) VEHICLE LANE DETERMINATION METHOD, COMPUTER PROGRAM PRODUCT, AND APPARATUS

(71) Applicant: APTIV TECHNOLOGIES LIMITED, St. Michael (BB)

(72) Inventors: Aron Sommer, St. Michael (BB); Aniello Sorrentino, St. Michael (BB)

(73) Assignee: Aptiv Technologies AG, Schaffhausen (CH)

( * ) Notice: Subject to any disclaimer, the term of this patent is extended or adjusted under 35 U.S.C. 154(b) by 245 days.

(21) Appl. No.: 18/144,983

(22) Filed: May 9, 2023

(65) Prior Publication Data

US 2023/0368672 A1     Nov. 16, 2023

(30) Foreign Application Priority Data

May 13, 2022     (GB) ...................................... 2207028
Apr. 25, 2023     (EP) .................................... 23169913

(51) Int. Cl.
*G08G 1/00*          (2006.01)
*B60W 60/00*          (2020.01)
          (Continued)

(52) U.S. Cl.
CPC ............. *G08G 1/20* (2013.01); *B60W 60/001* (2020.02); *G01S 7/415* (2013.01); *G01S 13/931* (2013.01);
          (Continued)

(58) Field of Classification Search
None
See application file for complete search history.

(56) References Cited

U.S. PATENT DOCUMENTS 10,963,708 B2 *     3/2021     Schack ................ G06V 20/588
2005/0195383 A1 *     9/2005     Breed .................... G01S 7/481
                                                      356/28

(Continued)

FOREIGN PATENT DOCUMENTS

DE     102014200638 A1     7/2015
DE     102016100718 A1     7/2017
KR     20180007087 A     1/2018

OTHER PUBLICATIONS

Combined Search and Examination Report issued by the UK Intellectual Property Office in connection with International Application No. GB2207028.8, dated Nov. 14, 2022.

(Continued)

*Primary Examiner* — Bernarr E Gregory
(74) *Attorney, Agent, or Firm* — Miller Johnson

(57)          ABSTRACT

A vehicle lane determination method includes determining radar data acquired at an ego vehicle. The method includes determining a current road curvature and an upcoming road curvature. The method includes extracting characteristics from the radar data associated with other vehicles. The extracted characteristics include positional information for the other vehicles relative to the ego vehicle. Extracting characteristics from the radar data includes selecting a road coordinate system based at least in part on the current and upcoming road curvature. The positional information includes a representation in the selected road coordinate system. The method includes determining the lane of the ego vehicle based on the extracted characteristics meeting a set of lane determination conditions.

13 Claims, 3 Drawing Sheets

(51) Int. Cl.

| | |
|---|---|
| *G01S 7/41* | (2006.01) |
| *G01S 13/931* | (2020.01) |
| *G08G 1/01* | (2006.01) |
| *G08G 1/052* | (2006.01) |
| *G08G 1/056* | (2006.01) |

(52) U.S. Cl.
CPC ......... *G08G 1/0112* (2013.01); *G08G 1/0125* (2013.01); *G08G 1/052* (2013.01); *G08G 1/056* (2013.01); *B60W 2420/408* (2024.01); *B60W 2520/06* (2013.01); *B60W 2554/4041* (2020.02); *B60W 2554/4044* (2020.02)

(56) References Cited

U.S. PATENT DOCUMENTS

| | | | |
|---|---|---|---|
| 2009/0326752 A1 | 12/2009 | Staempfle et al. | |
| 2015/0025789 A1* | 1/2015 | Einecke ............... | G06V 20/588 |
| | | | 701/408 |
| 2016/0171893 A1 | 6/2016 | Chen | |
| 2018/0137376 A1* | 5/2018 | Suzuki ................... | G08G 1/167 |
| 2019/0100200 A1 | 4/2019 | McNew et al. | |
| 2020/0004246 A1 | 1/2020 | Prasad et al. | |

OTHER PUBLICATIONS

Extended European Search Report for EP23169913.3 dated Sep. 5, 2023, 11 pages.

Adam et al., "Probabilistic road estimation and lane association using radar detections", Information Fusion (FUSION), 2011 Proceedings of the 14th International Conference on, IEEE, (Jul. 5, 2011), ISBN 978-1-4577-0267-9, pp. 1-8.

Communication pursuant to Article 94(3) EPC received for EP23269913.3 dated Aug. 19, 2025, 7 pages.

* cited by examiner

Fig. 6
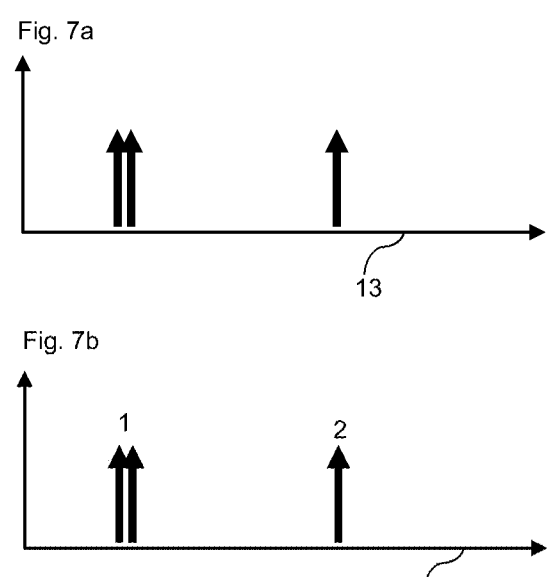
Fig. 7a
Fig. 7b
Fig. 8
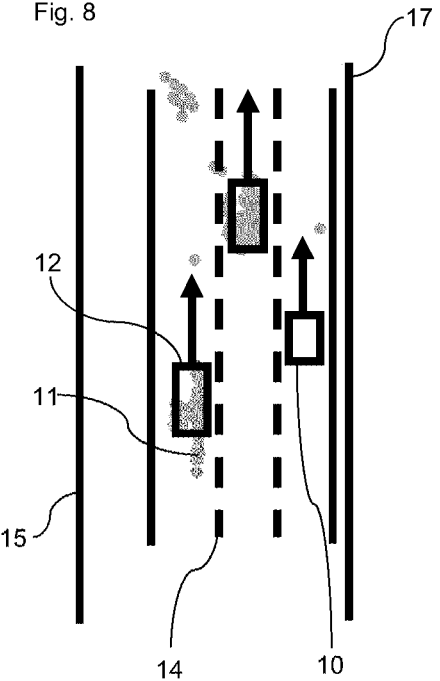
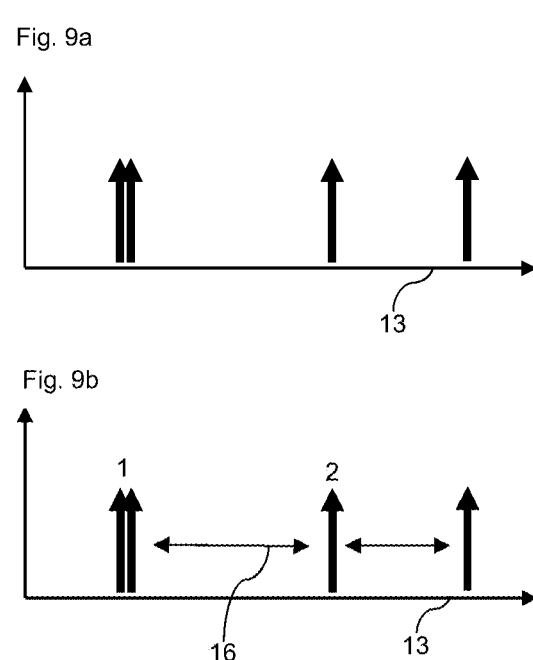
Fig. 9a
Fig. 9b

VEHICLE LANE DETERMINATION METHOD, COMPUTER PROGRAM PRODUCT, AND APPARATUS

CROSS-REFERENCE TO RELATED APPLICATIONS

This application claims priority to European patent application number EP 23169913.3 filed on Apr. 25, 2023 and United Kingdom patent application number GB 2207028.8 filed on May 13, 2022. The entire disclosures of the above applications are incorporated by reference.

FIELD

The present disclosure relates to a vehicle lane determination method, computer program, and processing apparatus. The present disclosure is particularly relevant to road lane determination methods and processing devices for use in autonomous driving systems and ADAS (advanced driver-assistance systems).

BACKGROUND

Modern vehicles typically include autonomous driving systems and/or ADAS. Functions within these systems often need to determine the particular road lane that the ego vehicle is currently traveling in. For example, the determined lane will have a bearing on vehicle navigation or vehicle lane centering functions. For instance, at complex highway junctions, the navigation system may need to specify to the driver which lane to drive in. Similarly, autonomous driving systems need to know which lane to follow.

Conventionally, a common technique of determining the current lane involves image processing a feed from a vehicle camera to identify the lane markings on a road. However, there are problems with this technique. Firstly, its reliability is reduced during bad weather conditions or at night. Equally, on multiple lane highways, it can often be difficult for the vehicle camera to see all the road lanes from the camera's fixed position on the vehicle. At the same time, other vehicles can block the camera's view of the lane markings, or markings can fade over time. In some scenarios, it can also be difficult to differentiate lanes when there are unusual road layouts, such as when emergency lanes are present, or where the lane markings are misleading.

A further issue arises in that higher levels of autonomous driving require a second channel, which uses a different sensor type, for plausibility checking.

To address the above limitations, it has been suggested to use radar by repainting the lane markers with special radar reflective paint. However, this is exceptionally expensive to implement. Equally, techniques have been proposed where radar is used to determine the vehicle's distance to the road's guardrails, and this distance is used to then estimate the number of lanes in between. However, this is not always accurate and is reliant on guardrails being present.

Accordingly, there remains a need to address the above shortcomings in conventional vehicle lane determination systems and methods.

SUMMARY

According to a first aspect, there is provided a vehicle lane determination method including the steps of: determining radar data acquired at an ego vehicle; extracting characteristics from the radar data associated with other vehicles, wherein the extracted characteristics comprise positional information for the other vehicles relative to the ego vehicle, and wherein the step of extracting comprises selecting a road coordinate system and the positional information comprises a representation in the selected road coordinate system; and determining the lane of the ego vehicle based on the extracted characteristics meeting a set of lane determination conditions.

In this way, a radar-based system is provided for lane determination, which utilizes radar data containing information about surroundings and other vehicles, such as other cars, lorries, buses, and motorbikes, to identify the current lane of the ego vehicle. That is, the extracted characteristics from the radar data may correspond to parameters indicating other vehicles in adjacent road lanes to the ego vehicle. At the same time, information on the current road may be used to improve lane determination accuracy. For example, lane-splits or lane mergers, as well as the number of lanes can be used to interpret the positional information of other cars and may be independent of ego-position of the vehicle. As such, the number and position of the other vehicles may be accurately used to determine the number of lanes on one or both sides of the ego vehicle's current lane and thereby allow the ego-lane to be determined. That is, positional information providing the pose (i.e., the position and orientation) of other detected vehicles can be used to determine the ego vehicle's lane. Advantageously, this avoids the need for expensive repainting of road markings or the presence of guiderails on roads in order to facilitate lane position detection. Equally, the limitations of camera-based systems, such as low reliability in poor weather or at night, are avoided. The radar data may also be processed in conjunction with location and standard or high-definition map data to provide improved accuracy and/or plausibility determination.

In embodiments, the step of extracting characteristics from the received radar data comprises identifying other vehicles moving in a same longitudinal direction to the ego vehicle. In this way, objects in radar data are identified semantically, and subsequent processing can be optimized based on the location and movement of the identified other vehicles.

In embodiments, the vehicle lane determination method further includes the step of filtering out static from the radar data. In this way, radar data arising from stationary objects, such as objects, such as guardrails, trees, bridges, etc., on the road area, may be filtered out. This filtering may be actioned before subsequent processing steps to minimize the amount of data to be processed.

In embodiments, the vehicle lane determination method further includes the step of filtering out other vehicles moving in a different longitudinal direction to the ego vehicle. In this way, radar data associated with objects moving in the opposite direction, such as vehicles in the adjacent roadway traveling in the other direction, may be filtered out.

In embodiments, the positional information comprises a representation of the other vehicles in a lateral direction relative to the ego vehicle. In this way, the lateral offset of other vehicles relative to the ego vehicle may be determined.

In embodiments, the selected road coordinate system is selected to account for a location of the ego vehicle. In this way, the vehicles' current position may be used to improve lane determination accuracy. As such, the position of the ego-vehicle can be used to select the road coordinate system, such that its positional information improves lane determination. The location of the ego vehicle may be derived from map in combination with GNSS/positional data or other sensor measurements.

In embodiments, the selected road coordinate system is selected to account for the current road characteristics. In this way, characteristics such as road layout or road curvature can be accounted for when interpreting the radar data. In embodiments, the current road characteristics may be obtained from a database or derived from vehicle sensor measurements. Accordingly, semantic information of the road (road characteristics) can be used to select the road coordinate system, such its semantic information improves lane determination and can be derived either from map in combination with GNSS/positional data or other sensor measurements.

In embodiments, the extracted characteristics from the radar data further comprise at least one of the speed, heading, yaw rate, orientation, acceleration, positions, and size of the other vehicles. In this way, the determination accuracy may be improved by accounting for movement of the other vehicles.

In embodiments, the step of determining the lane of the ego vehicle further comprise accounting for at least one of the speed, heading, yaw rate, orientation, acceleration and size of the ego vehicle. In this way, a sensed motion of the ego vehicle may be used to improve the determination, for example by identify bends in the road or other road features.

In embodiments, the step of extracting characteristics includes clustering. In this way, clustering, such as K-means clustering, may be used to process radar data for identifying other vehicles.

In embodiments, the step of extracting characteristics comprises accounting for a determined minimum lateral distance between other vehicles. In this way, known characteristics about road lane spacing may be used to improve lane determination accuracy.

In embodiments, the step of determining the lane of the ego vehicle comprises using data from road coordinate system. In embodiments, the step of determining the lane of the ego vehicle comprises accounting for a known number of lanes for the location of the ego vehicle determined from road data. In this way, known information/characteristics about the number of road lanes may be used to improve lane determination accuracy.

In embodiments, the road data comprises a road map. In this way, lane data from a standard or high-definition road map may be utilized to provide improved lane determination accuracy.

In embodiments, the vehicle lane determination method further includes the step of verifying a plausibility for the determined lane of the ego vehicle based on at least one of: (a) a known number of lanes for the location of the ego vehicle, or (b) filtering the determined lane over time. For example, a Kalman filter or extended Kalman filter (EKF) may be used to account for previous lane determination results. In this way, a confidence level may be provided for cross checking the result provided by the processed radar data. In embodiments, the step of determining the plausibility further comprises filtering out determinations having a low probability.

According to a second aspect, there is provided a computer program product including instructions which, when the program is executed by a computer, cause the computer to carry out the steps of the above method. In this way, a computer program product is provided for implementing the above method.

According to a third aspect, there is provided a non-transitory computer readable medium including instructions, which when executed by a processor, cause the processor to execute the above method. In this way, a non-transitory computer readable medium is provided for implementing the above method.

According to a fourth aspect, there is provided a processing apparatus implementing the above method.

According to a fifth aspect, there is provided a vehicle comprising:

an Advanced Driver Assistance System, ADAS, for implementing one or more functions; and the above processing apparatus for inputting a determined lane of the vehicle to the ADAS for use during the one or more functions.

BRIEF DESCRIPTION OF THE DRAWINGS

Illustrative embodiments will now be described with reference to the accompanying drawings in which:

FIG. 6 is a schematic illustration of a vehicle lane determination method according to a third embodiment;

FIGS. 7a-7b show illustrative histograms used in the third embodiment;

FIG. 8 is a schematic illustration of a vehicle lane determination method according to a fourth embodiment; and FIGS. 9a-9b show illustrative histograms used in the fourth embodiment.

DETAILED DESCRIPTION

Figure 1:
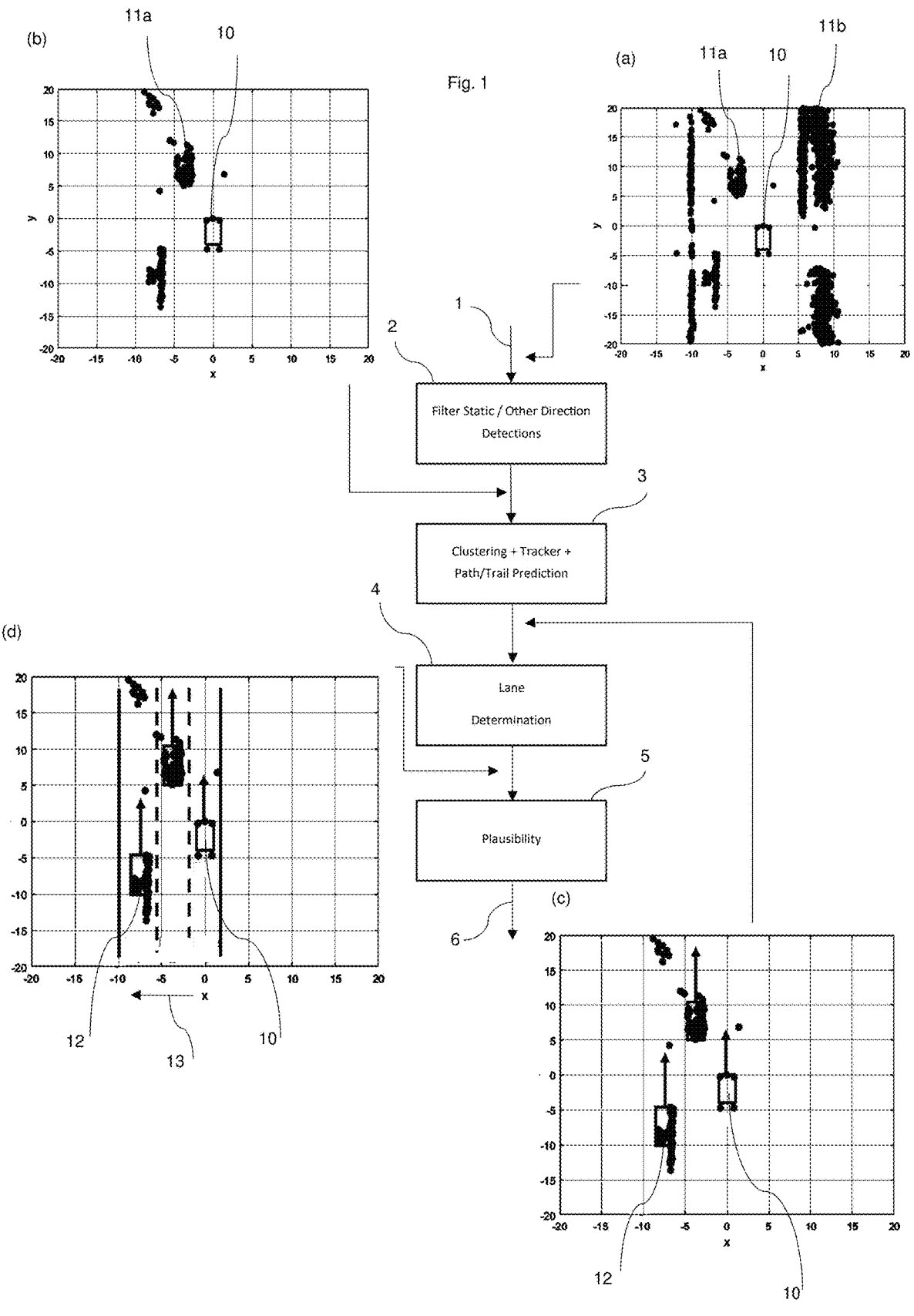
FIGS. 1a-1d are a flow diagram of a vehicle lane determination method according to a first embodiment.
Figure 2:
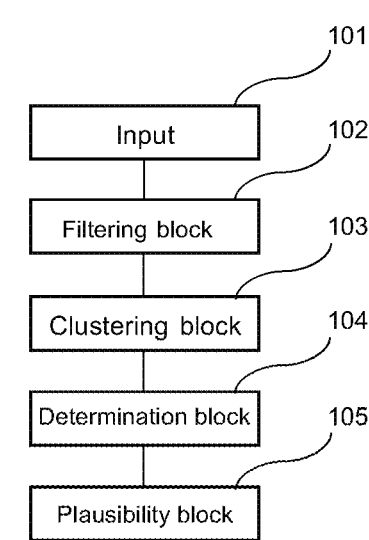
FIG. 2 is a schematic illustration of a processing apparatus used for lane determination according to the first embodiment.

Embodiments of the invention utilize radar detections determined from radar data moving in the same longitudinal direction as ego vehicle and reflected back from surrounding vehicles to determine the lane-number of the ego vehicle. In this respect, FIG. 1 is a flow diagram of a vehicle lane determination method according to a first embodiment, and FIG. 2 is a schematic illustration of a processing apparatus for implementing the first embodiment.

In step 1, radar data is received at an input 101. As shown in the insert (a) in FIG. 1, each received radar detection 11 is associated with a position in the vehicle coordinate system (VCS) relative to the ego vehicle 10.

In step 2, the detections 11 are filtered through a filtering block 102 to remove non-relevant detections 11b associated with non-moving objects or objects moving in an opposite direction. For example, in the insert (a) in FIG. 1, a high density of unwanted detections 11b are received from vehicles in the adjacent roadway travelling in the opposite direction. These unwanted detections may be filtered out based on, for example, their range rate or their tracked trails, to provide a filtered output of relevant detections 11a mapped within the VCS, as shown in the insert (b) in FIG. 1.

This filtered output is then processed through a clustering block 103, which clusters the relevant detections 11*a* into clusters 12 associated with objects with respect to their lateral offset within the VCS. For illustration, this is shown graphically in the insert (c) in FIG. 1. In embodiments, a K-means clustering methodology is used. In this embodiment, the clustering block 103 also projects the movement of the clustered detections, and hence the associated objects, integrating in known information on the number of lanes derived from standard or high-definition map data. The clustering block 103 may also receive yaw sensor data from within the vehicle to thereby identify bends in the roadway and account for this in the clustering process.

In step 4, the clustered data is processed by a determination block 104 for determining the lane of the ego vehicle 10. For this, the detection clusters 12 are counted as neighboring vehicles in at least one offset direction 13 (e.g., to the left of the ego vehicle). That is, the lane-number of the ego vehicle may be determined by adding one to the number of clusters identified to the left (or right) of the ego vehicle 10. For example, in the insert (d) in FIG. 1, two clusters 12 are detected, indicating the ego vehicle 10 is in the third lane. In other embodiments, the clusters in both lateral directions may be used in combination to determine the lane-number.

In step 4, the determined vehicle lane may be processed by a plausibility block 105 to filter or smooth erroneous determinations. In embodiments, this may be implemented based on the known number of lanes provided by map data. The plausibility block 105 may also track the lane number of the ego vehicle over time and integrate this using, for example, Markov-Models to improve the robustness of the output result 6.

Figure 3:
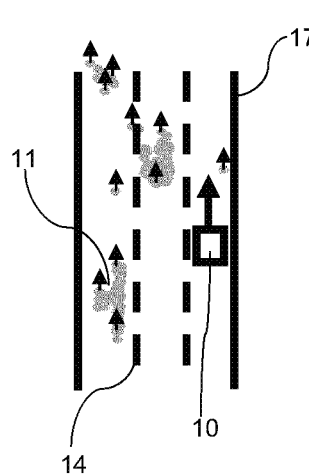
FIG. 3 is a schematic illustration of a vehicle lane determination method according to a second embodiment.
Figure 4A:
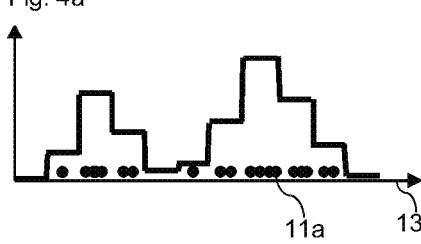
FIGS. 4a-4b show illustrative histograms used in the second embodiment.
Figure 4B:
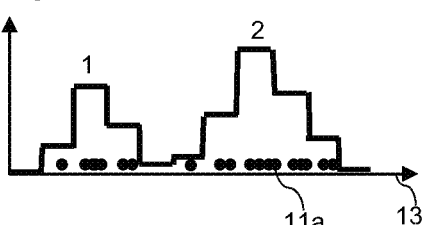
Figure 5:
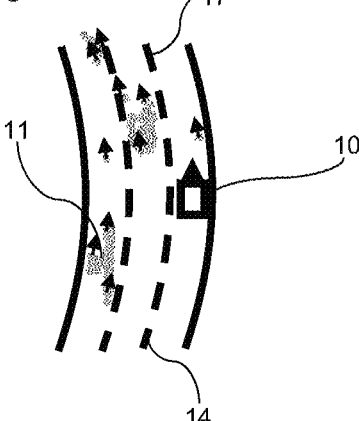
FIG. 5 is a schematic illustration of the second embodiment when applied to a curved road.

A second embodiment will now be described in relation to FIGS. 3 to 5. This embodiment is very similar to the first embodiment and hence will only be described briefly. As shown in FIG. 3, radar detections are again filtered to remove static detections and detections that are not moving in the ego direction. Detections 11 along a selected road coordinate system 17 are then represented onto a lateral offset direction, taking the road curvature into account.

In this connection, a road coordinate system 17 contains both semantic information and positional information about the road. Semantic information can be for example the type of the road (motorway, urban street, etc.), the shape of the road (straight, curve, intersection, etc.), the width of the road, the number and the width of lanes, the boundary type of the road (guardrails, curb stones, etc.), the road layout (structure of lanes like splits and merges), the road curvature and other such road characteristic information. The positional information can be for example lane-level information (coordinates of lanes, lane-markers and virtual center-lines), coordinates of road boundaries, coordinates of objects like signs and many more. In embodiments, the semantic and positional information can be derived from a map (e.g., HD-Map) or can be derived from sensor measurements. For example, by detecting the guardrails, the road width can be determined and from the road width a maximal number of lanes can be derived. Also, the shape of the road or the road curvature can be derived from sensor measurements. In other words, the semantic information can be seen as "coarse" information, while the positional information is effectively "fine" information with coordinates.

The road coordinate system 17, especially the semantic attributes can be selected by selecting its type (e.g., motorway) and/or its shape (e.g., curve with specific curvature). Selection can also take into account the position of the ego-vehicle. For example, if a road coordinate system is derived from a map, the location of the vehicle is used to select the correct road coordinate system current road segment from the map and hence thus the need to be selected.

Furthermore, a road characteristic is a single element of the semantic information of the road coordinate system. For example, the shape of the road or the road width are a characteristic.

The selection of the road coordinate system 17 may be based on map data in combination with GNSS/positional data, as well as other sensor measurements. For example, the unfiltered radar data received at input 101 may be used, at least in part, to determine the selection of the road coordinate system.

Accordingly, the selected road coordinate system 17 provides information on the both the current and upcoming road curvature/shape derived, for instance, from map data and/or estimated from a detected yaw rate for the ego vehicle and other sensor data. As such, whether the road is straight, as shown in FIG. 3, or curved, as shown in FIG. 5, a similar histogram of relevant radar detections 11*a* against lateral offset 13 may be produced, as shown in FIG. 4*a*. It will be understood that the histogram is shown for illustration, and it may not be created in practice. As described above in relation to FIG. 1, the clusters of relevant detections 11*a* may then be counted as shown in FIG. 4(*b*), taking into account the minimum spacing dictated by the lane markings 14. The lane number of the ego-vehicle may then be determined.

A third embodiment will now be described in relation to FIGS. 6 and 7. This embodiment is again similar to the first and second embodiments, but clusters of detections 11 are identified as objects 12. The driving direction of the objects 12 is then tracked, and the number of laterally offset objects is counted, again accounting for a minimum lateral spacing distance between them. As shown in FIG. 7*a*, three objects are detected, but as shown in FIG. 7*b*, the clustering process identifies only two lanes are present because the two detections at position "1" are too close together to relate to separate lanes. The ego vehicle is then identified as being in lane three.

A fourth embodiment will now be described in relation to FIGS. 8 and 9. This embodiment is similar to the third embodiment but makes use of additional information provided by a high-definition map in selecting the road coordinate system 17. In this case, the clustering block 103 may take into account known distances between the lanes, as well as the distances between the road's guardrails/barriers 15. As shown in FIG. 9(*b*), this may provide more precise minimum distance parameters 16 for differentiating objects along the lateral offset.

Accordingly, with the above arrangements, a radar-based system is provided for lane determination, which utilizes detections from other vehicles and objects to identify the current lane of the ego vehicle. As such, characteristics from the radar data associated with other vehicles, such as cluster detections, may thereby be used to determine the ego lane. Advantageously, this avoids the need for expensive repainting of road markings or the provision of guiderails. Equally, the limitations of camera-based systems, such as low reliability in poor weather or at night, are avoided. The radar data may also be processed in conjunction with location and standard or high-definition map data to provide improved accuracy and/or plausibility determination.

It will be understood that the embodiments illustrated above show applications only for the purposes of illustration. In practice, embodiments may be applied to many different configurations, the detailed embodiments being straightforward for those skilled in the art to implement.

For example, it will be understood that, while the apparatus described in FIG. 2 shows a plurality of separate blocks, these processing functions may be implemented using one or more microprocessors, such as within a vehicle electronic control unit (ECU).

The invention claimed is:

1. A vehicle lane determination method comprising:
determining radar data acquired at an ego vehicle;
determining a current road curvature and an upcoming road curvature;
extracting characteristics from the radar data associated with other vehicles, wherein:
  the extracted characteristics include positional information for the other vehicles relative to the ego vehicle,
  extracting characteristics from the radar data includes selecting a road coordinate system based at least in part on the current and upcoming road curvature, and
  the positional information includes a representation in the selected road coordinate system; and
determining the lane of the ego vehicle based on the extracted characteristics meeting a set of lane determination conditions.

2. A vehicle lane determination method according to claim 1, wherein extracting characteristics from the determined radar data includes identifying other vehicles moving in a same longitudinal direction to the ego vehicle.

3. A vehicle lane determination method according to claim 1, wherein the positional information includes a representation of the other vehicles in a lateral direction relative to the ego vehicle.

4. A vehicle lane determination method according to claim 1, wherein the selected road coordinate system is selected to account for a location of the ego vehicle.

5. A vehicle lane determination method according to claim 1, wherein the selected road coordinate system is selected to account for the current road characteristics.

6. A vehicle lane determination method according to claim 1, wherein the extracted characteristics from the radar data include at least one of speed, heading, yaw rate, orientation, acceleration, positions, and size of the other vehicles.

7. A vehicle lane determination method according to claim 1, wherein determining the lane of the ego vehicle further comprise accounting for at least one of speed, heading, yaw rate, orientation, acceleration and size of the ego vehicle.

8. A vehicle lane determination method according to claim 1, wherein extracting characteristics includes accounting for a determined minimum lateral distance between other vehicles.

9. A vehicle lane determination method according to claim 1, wherein determining the lane of the ego vehicle includes using data from the selected road coordinate system.

10. A vehicle lane determination method according to claim 1, wherein determining the lane of the ego vehicle includes accounting for a known number of lanes for a location of the ego vehicle determined from road data.

11. A vehicle lane determination method according to claim 1, further comprising verifying a plausibility for the determined lane of the ego vehicle based on at least one of: (a) a known number of lanes for a location of the ego vehicle, or (b) filtering the determined lane over time.

12. A non-transitory computer readable medium comprising instructions including:
determining radar data acquired at an ego vehicle;
determining a current and upcoming road curvature;
extracting characteristics from the radar data associated with other vehicles, wherein:
  the extracted characteristics include positional information for the other vehicles relative to the ego vehicle,
  extracting includes selecting a road coordinate system based at least in part on the determined current and upcoming road curvature, and
  the positional information includes a representation in the selected road coordinate system; and
determining a lane of the ego vehicle based on the extracted characteristics meeting a set of lane determination conditions.

13. A vehicle comprising:
an Advanced Driver Assistance System (ADAS) configured to implement one or more functions; and
a processing apparatus configured to:
  determine radar data acquired at the vehicle;
  determine a current and upcoming road curvature;
  extract characteristics from the radar data associated with other vehicles, wherein:
    the extracted characteristics include positional information for the other vehicles relative to the vehicle,
    extracting includes selecting a road coordinate system based at least in part on the determined current and upcoming road curvature, and
    the positional information includes a representation in the selected road coordinate system;
  determine a lane of the vehicle based on the extracted characteristics meeting a set of lane determination conditions; and
  provide the determined lane to the ADAS for use in the one or more functions.

* * * * *